Patented Oct. 22, 1946

2,409,878

UNITED STATES PATENT OFFICE 2,409,878

LUBRICATING OIL

Robert L. May, Chicago, Ill., assignor to Sinclair Refining Company, New York, N. Y., a corporation of Maine No Drawing. Application July 15, 1944, Serial No. 545,195

5 Claims. (Cl. 252—32.7)

This invention relates to a lubricating oil composition having improved characteristics especially with respect to oxidation and corrosion.

In my Patent No. 2,379,313 I have described and claimed a new class of organic-metal compounds comprising the zinc salts of organic compounds resulting from the reaction of an alkylated phenol with a condensation product of a terpene, such as is present in turpentine, and phosphorus pentasulfide. The turpentine-phosphorus pentasulfide condensation products are the subject of my co-pending application, Serial No. 494,688, filed July 14, 1943, and the materials resulting from the reaction thereof with alkylated phenols are the subject of my Patent No. 2,379,312.

I have now discovered that the zinc salts of my first said patent are especially effective in repressing or inhibiting the deterioration of lubricating oil compositions and the corrosion of metal parts in contact therewith.

I am at present unable definitely to identify by chemical formula either the zinc salts or the condensation products of turpentine and phosphorus pentasulfide or the products resulting from the reaction of said condensation product with the alkylated phenol. For convenience and brevity, I shall herein refer to the former as my inhibitor, to the condensation product as the turpentine-$P_2S_5$ condensation product and to the composition resulting from the reaction of the alkylated phenol with the turpentine-$P_2S_5$ condensation product as the intermediate material, each of which is hereinafter more fully described.

Although the intermediate material itself has been found to be a desirable component of lubricating oil compositions, the use of such intermediate materials for this purpose is subject to certain disadvantages. For instance, it is subject to the objection that they have somewhat acidic characteristics, due to phosphorus acidity which has been found to have a tendency to promote sludging of mineral oil compositions. The lubricating oil compositions of my present invention are free from this objection.

In general, my inhibitor may be prepared by reacting zinc oxide with the intermediate material by intimately admixing the zinc oxide with the intermediate material with moderate heating. The product of this reaction is then with advantage diluted and filtered to remove any excess or unreacted zinc oxide present. In the preparation of such compounds for use as a constituent of my improved lubricating oil compositions, the diluent is with advantage a light neutral lubricating oil fraction which may be permitted to remain in the product.

The characteristics of my inhibitors vary somewhat depending upon the characteristics of the turpentine-$P_2S_5$ condensation product, the nature and proportions of the alkylated phenols reacted therewith to form the intermediate material, the conditions under which the reactions are effected and to some extent upon the proportions of zinc oxide and the intermediate material used in its production. Also the character of the inhibitor is influenced by the conditions under which the zinc oxide is reacted with the intermediate material.

The reaction temperature employed in the last mentioned reaction, in the preparation of my inhibitor, is with advantage maintained within the range of about 275° F. to about 300° F., although reaction temperatures somewhat outside of this range are permissible. Particularly desirable results have been obtained where the temperature has been raised to about 280° F. during this reaction. Also I have found it desirable to use an amount of zinc oxide somewhat in excess of that equivalent to the acid number of the intermediate material and to filter off unreacted excess zinc oxide as previously indicated.

The lubricating composition of my present invention may consist solely of the lubricating oil constituent and my inhibitor. However, the inhibitor of my present invention has been found to be compatible with other desirable lubricating oil addends and the inclusion of such other addends, especially addends of the type known as detergents, is within the contemplation of my present invention and constitutes an important aspect thereof.

The inclusion of certain so-called detergents, for instance, in internal combustion engine lubricants, has been found highly advantageous. An especially effective lubricating oil composition for the lubrication of internal combustion engines and the like, contemplated by my present invention, is one comprising, in addition to the lubricating oil constituent and my inhibitor, a minor proportion of a calcium-containing detergent, for instance, the calcium salt of various alkyl esters of aromatic acids, particularly the calcium salt of iso-octyl salicylate and the calcium salt of capryl salicylate. These and various other organic-calcium salts have been found particularly effective as detergents in lubricating oil compositions used in internal combustion engines, the two particularly named calcium salts being more fully described in Letters Patents 2,347,547 and 2,339,692, issued on applications of Willard L. Finley.

A further highly effective lubricating oil composition contemplated by my present invention is one comprising, in addition to the lubricating oil constituent and my inhibitor, a calcium petroleum sulfonate, as a detergent. Other detergents which may be used with advantage include the barium phenolate of sulfurized diamyl phenol, such as currently marketed under the trade name of "Aerolube B," metallic phenolates of sulfurized tertiary amyl phenol, such as currently marketed under the trade names "Calcium Paranox" and "Barium Paranox" and various metallic soaps, either basic or neutral, metallic sulfonates, alcoholates and alkoxides and metallic derivatives of alkylated salicylic acid.

When used in conjunction with these detergents, particularly the calcium salts, including calcium petroleum sulfonates previously mentioned, these detergents and my inhibitors have been found to complement each other so that the effectiveness of each is promoted. The tendency of the detergent to promote oxidation of the oil at the termination of its oxidation induction period is minimized by the presence of my inhibitor without destroying the effectiveness of either the detergent or the inhibitor.

The proportions of the inhibitor used in the compounding of my improved lubricating oil composition may be varied somewhat but in any case only a minor proportion is used. The optimum proportion to be used will depend upon whether or not a detergent, such as previously mentioned, is present and the particular use to which the lubricating oil composition is to be put. The optimum proportion will also vary, depending upon the particular member of my new class of inhibitors used.

In the preparation of my improved lubricating oil composition, I have found it advantageous to prepare the inhibitor in solution in about an equal weight of a petroleum lubricating oil fraction, as hereinafter more fully described. As a motor oil which does not contain detergents, 0.2 to 0.5% of the 50% concentrate of my inhibitor may, with advantage, be admixed with the lubricating oil constituent. When used as an anti-oxidant in turbine oils or hydraulic oils, the 50% concentrate may be added to the lubricating constituent in proportions advantageously ranging from about 0.1 to about 0.3% by weight. In heavy duty oils containing detergents, such as previously mentioned, for use in gasoline or Diesel engines, the 50% concentrate of my inhibitor may, with advantage, be added in proportions ranging from about 1% to about 10% by weight, depending upon the nature and concentration of the detergent, the severity of the service for which the lubricating oil composition is to be used and the particular inhibitor employed.

The molar proportions of $P_2S_5$, turpentine and alkylated phenol used in the preparation of the intermediate material, which I react with zinc oxide in the preparation of my new class of inhibitors, may be varied over a considerable range. Molar proportions of 2:6:3 have been used with particular advantage, assuming the molecular weight of the turpentine to be 136. However, for each two moles of $P_2S_5$ there may be used 5 to 7 moles of turpentine and 1 to 5 moles of alkylated phenol, but it is desirable that the sum total of the number of moles of turpentine and the moles of alkylated phenol for each two moles of $P_2S_5$ fall within the range of about 8:10.

In the preparation of my novel class of inhibitors considerable latitude is permissible in the selection of the alkylated phenol used. In general, the alkyl radical of the alkylated phenol should be a saturated aliphatic group. Each molecule of the alkylated phenol may contain one or more such groups. The number of carbon atoms in each aliphatic group is not critical. Desirable products may be obtained where each such group contains from 1 up to 12 to 16, or even up to 25 to 35 carbon atoms. Alkylated phenols containing 5 or more carbon atoms in each alkyl group have been found especially desirable, because of the greater oil solubility of the resultant product. The alkyl group or groups may be either normal or branched chain.

Alkylated phenols, herein designated codimer alkylated phenols, such as prepared by the reaction, in the presence of sulfuric acid, of phenols with the olefines in commercial codimer, resulting from the phosphoric acid polymerization of mixed olefines of 4 carbon atoms or less per molecule and comprising propylene, butene-1, butene-2 and iso-butylene, the codimer consisting of a major portion of $C_8$ olefines, together with some $C_6$, $C_7$, $C_9$, $C_{10}$, $C_{11}$, $C_{12}$ and higher olefines, have been used with advantage. These codimer alkylated phenols are comprised primarily of mono- and poly-alkylated phenols having alkyl groups, as noted above, but with $C_8$ alkyl groups predominating.

I have further used with advantage in the preparation of my improved lubricating oil composition, alkylated phenols, prepared by the method just described for the preparation of codimer alkylated phenols except that the phenol was reacted with codimer bottoms, the codimer bottoms used being the bottoms obtained by a redistillation of the previously described codimer to a 350 to 360° F. end point overhead. This bottom was comprised primarily of $C_{12}$ olefines, but contains some somewhat lower and some somewhat higher molecular weight olefines.

As previously noted, I am at present unable definitely to identify by chemical formula either the inhibitor used in the preparation of my improved lubricating oil compositions or the intermediate material or the turpentine-$P_2S_5$ condensation product from which they are prepared. However, I have found it desirable that the turpentine-$P_2S_5$ condensation product used in accordance with my present invention contain no unreacted $P_2S_5$.

Since the characteristics of my improved lubricating oil composition are somewhat influenced by the characteristics of the particular inhibitor used, which in turn are influenced by the characteristics of the intermediate materials from which my inhibitors are prepared, a detailed description of the preparation and the character of the particular inhibitor used will be included in the specific illustrations of my invention hereinafter set forth. However, it will be understood that my invention is not limited to the use of these particular inhibitors illustrated nor with respect to the method by which the inhibitor is prepared, but includes lubricating oil compositions comprising the inhibitors herein described by whatever process the inhibitor may be made.

Generally, in the preparation of the turpentine-$P_2S_5$ condensation product used in the preparation of my inhibitors, the molar ratio of turpentine-$P_2S_5$ is with advantage approximately 3:1. However, this ratio may vary somewhat in either direction. For instance, highly desirable products may be produced from intermediate material which in turn have been produced from turpentine-$P_2S_5$ condensation products in which the ratio of turpentine to $P_2S_5$ is within the range of about 5:2 to about 7:2, as previously noted.

The reaction of turpentine with $P_2S_5$ is highly exothermic and proceeds spontaneously after being initiated by slight heating. A desirable method of effecting this reaction is to heat the turpentine in a vessel to about 200° F. and then, without further heating, slowly stirring in the phosphorus pentasulfide in the powdered form. The heat of reaction is great and, consequently, the sulfide should be added slowly so as to avoid the possibility of the reaction's becoming uncontrollable. For the purpose of my present invention, it is desirable that the temperature during this addition not be permitted to exceed about 250° F., although higher temperatures are permissible.

After the addition of phosphorus pentasulfide is completed and the exothermic heating is lessened, it is usually necessary to apply heat externally to complete the reaction. The temperature during this last stage is preferably maintained at about 300° F., though temperatures of about 200 to about 400° F. may be employed. The second stage of the reaction should be continued until all of the $P_2S_5$ is dissolved. The material thus prepared is a viscous liquid at elevated temperatures, but, in the absence of excess turpentine, solidifies on cooling to room temperature.

In general, the intermediate material used in the preparation of my inhibitors may be prepared by adding the alkylated phenol gradually to the turpentine-$P_2S_5$ condensation product, advantageously at a temperature of about 230° F. The optimum temperature of the condensation product for the introduction of the alkylated phenol will vary, depending upon the particular alkylated phenol used. During the final step of the production of the turpentine-$P_2S_5$ condensation product, the temperature will usually be substantially in excess of 230° F., usually about 300° F., and in commercial operations two to three hours would normally be required for lowering the temperature to 230° F. by natural cooling. Such cooling is usually unnecessary and may be avoided since these alkylated phenols are relatively stable toward heat and may be safely admixed with the turpentine-$P_2S_5$ condensation products at temperatures as high as 300° F.

In reacting the alkylated phenols with the turpentine-$P_2S_5$ condensation products, very little heat is evolved. After the alkylated phenol has been added, the mixture is maintained at an elevated temperature, advantageously at about 200° F. or higher, for about one hour with stirring.

The following specific examples of various members of my new class of inhibitors and the procedure by which they have been successfully prepared, are given as illustrative of the class.

Example I 2040 grams of turpentine was placed in a flask equipped with a stirrer, a thermometer and a funnel, and heated therein to 240° F. There was then added to the turpentine 1110 grams of phosphorus pentasulfide at such a rate that the temperature of the reaction mixture did not rise above 275° F. The mixture was stirred during this addition. When all of the $P_2S_5$ had been added, the temperature of the mixture was raised to 300° F. and the mixture held at this temperature for two hours with stirring. At the end of this period, all of the phosphorus pentasulfide had dissolved and the product was a viscous, amber-colored liquid. Thereafter, the mixture was cooled to 230° F. and 1230 grams of p-tert-amyl phenol was added and the mixture stirred for one hour, at the end of which time 225 grams of zinc oxide was added, the mixture stirred for an additional hour and thereafter the temperature increased slowly to 280° F.

In order to facilitate filtration, the resulting product was thinned by intimately admixing therewith 4380 grams of a light petroleum lubricating oil fraction. The mixture was then filtered and the filtrate was found by analysis to have an acid number of 30.0 and an A. P. I. gravity of 11.1 and to contain 3.19% phosphorus, 8.64% sulfur and 0.48% zinc.

Example II

To a turpentine-$P_2S_5$ condensation product prepared, as in Example I, from 2040 grams of steam distilled wood turpentine, 1110 grams of powdered phosphorus pentasulfide, at a temperature of 230° F., there was added 1755 grams of diamylphenol and the mixture heated and stirred at a temperature of 200° F. for one hour. Thereafter, 225 grams of zinc oxide was added and the mixture stirred for one hour. The temperature was then gradually raised to 280° F. to complete the reaction.

The product of the reaction was then thinned, to facilitate filtration, by intimately admixing therewith 4905 grams of a light petroleum lubricating oil fraction and the mixture filtered. The filtrate was found by analysis to have an acid number of 28.3, an A. P. I. gravity of 13.1 and to contain 3.07% phosphorus, 7.82% sulfur and 0.24% zinc.

Example III

The product was prepared using the procedure, ingredients and proportions thereof identical with those of Example II, with the exception that the diamylphenol constituent was added to the turpentine-$P_2S_5$ condensation product while the latter was at a temperature of 300° F. The product was thinned and filtered, as previously described, and the filtrate was found by analysis to have an acid number of 26.2, an A. P. I. gravity of 13.8 and to contain 3.11% phosphorus, 8.28% sulfur and .21% zinc.

Example IV

A product was prepared by the procedure of Example II from 1700 grams of turpentine, 1110 grams of $P_2S_5$, 1755 grams of diamylphenol and 56 grams of zinc oxide. The product was thinned by intimately admixing therewith 4565 grams of a light petroleum lubricating oil fraction and was then filtered. The filtrate was found by analysis to have an acid number of 33.3, an A. P. I. gravity of 13.1 and to contain 3.67% phosphorus, 10.28% sulfur and 0.182% zinc.

Example V

A product was prepared by the procedure of Example II from 2040 grams of turpentine, 1110 grams of $P_2S_5$, 1172 grams of diamylphenol and 56 grams of zinc oxide. The product was thinned by intimately admixing therewith 4322 grams of a light petroleum lubricating oil fraction and thereafter filtered. The filtrate was found by analysis to have an acid number of 28.3, an A. P. I. gravity of 11.9 and to contain 3.20% phosphorus, 9.36% sulfur and 0.090% zinc.

Example VI

A product was prepared by the procedure of Example II using the constituents and proportions therein described except that, in place of the diamylphenol, 1425 grams of a butene alkylated phenol having a phenol number of 294.3 and an apparent molecular weight of 190 was used and the resulting product was thinned by admixing therewith 4575 grams of the light petroleum lubricating oil fraction. After filtration the filtrate was found to have an acid number of 31.3, an A. P. I. gravity of 12.8 and to contain 3.13% phosphorus, 7.19% sulfur and 0.46% zinc.

*Example VII*

A product was prepared by the procedure of Example II, using the constituents and proportions therein described except that, in place of the diamylphenol, 2050 grams of a codimer alkylated phenol having a phenol number of 203.7 and an apparent molecular weight of 275 was used and the product was thinned by intimately admixing therewith 5,200 grams of the light petroleum lubricating oil fraction. The product was then filtered and the filtrate was found by analysis to have an acid number of 23.7, an A. P. I. gravity of 14.4 and to contain 2.70% phosphorus, 7.83% sulfur and 0.13% zinc.

*Example VIII*

A product was prepared by the procedure described in Example II from 1632 grams of turpentine, 888 grams of $P_2S_5$, 2,149 grams of a codimer bottoms alkylated phenol, and 180 grams of zinc oxide. The codimer bottoms alkylated phenol used had a phenol number of 151.2 and an apparent molecular weight of 371. The resulting product was diluted by intimately admixing therewith 4669 grams of the light petroleum lubricating oil fraction and was filtered. The filtrate was found by analysis to have an acid number of 21.3, an A. P. I. gravity of 15.2, and to contain 2.86% phosphorus, 6.70% sulfur and 0.12% zinc.

*Example IX*

This product was prepared by the method and from the ingredients and proportions used in Example VIII except for using as the alkylated phenol constituent 1765 grams of codimer alkylated phenol having a phenol number of 190.9 and an apparent molecular weight of 294. The product was diluted prior to filtration by intimately admixing therewith 4285 grams of the light lubricating oil fraction. The filtrate was found by analysis to have an acid number of 25.0, an A. P. I. gravity of 14.5 and to contain 2.68% phosphorus, 7.51% sulfur and 0.23% zinc.

*Example X*

This product was prepared by the method and from the ingredients and proportions used in Example VIII except for using as the alkylated phenol constituent 2670 grams of a codimer bottoms alkylated phenol, consisting of a mixture of a codimer bottoms alkylated phenol having a phenol number of 125.9 and an apparent molecular weight of 445 and a codimer bottoms alkylated phenol having a phenol number of 124.7 and an apparent molecular weight of 448. Prior to filtration 5,190 grams of the lubricating oil diluent was added. The filtrate was found by analysis to have an acid number of 19.8, and A. P. I. gravity of 16.6 and to contain 3.12% phosphorus, 5.88% sulfur and 0.11% zinc.

*Example XI*

This product was prepared by the method and from the ingredients and proportion used in Example VIII except for using as the alkylated phenol constitutent 2570 grams of a codimer bottoms alkylated phenol consisting of a mixture of a codimer bottoms alkylated phenol having a phenol number of 134.9, an apparent molecular weight of 415 and a codimer bottoms alkylated phenol having a phenol number of 127.5 and an apparent molecular weight of 441. Prior to filtration, the product was diluted by the addition of 5090 grams of the lubricating oil fraction. The filtration was found by analysis to have an acid number of 20.5, an A. P. I. gravity of 16.5 and to contain 2.84% phosphorus, 6.43% sulfur 0.07% zinc.

*Example XII*

This product was prepared by the method and from the ingredients and proportions used in Example VIII except for using as the alkylated phenol constituent, 1920 grams of a codimer bottoms alkylated phenol having a phenol number of 116.2 and an apparent molecular weight of 483. Prior to filtration the product was diluted by the addition of 4440 grams of the lubricating oil fraction. The product was found by analysis to have an acid number of 22.5, an A. P. I. gravity of 15.2 and to contain 2.62% phosphorus, 7.68% sulfur and 0.115% zinc.

The light petroleum oil fraction used in each of the foregoing examples to facilitate filtration was a Mid-Continent neutral having the following characteristics:

| | |
|---|---|
| Gravity, °A. P. I. | 27.9 |
| Flash, °F | 365 |
| Fire, °F | 405 |
| Viscosity at 100° F., SUS | 107.8 |
| Viscosity at 210° F., SUS | 39.5 |
| Pour, °F | 20 |
| Color | 2— |

The codimer alkylated phenol and the codimer bottoms alkylated phenol were prepared as previously described herein. From the foregoing specific illustrations, it appears that the combining ratios of zinc oxide and the intermediate materials vary somewhat with the excess of zinc oxide present. The duration of the reaction period also appears to influence the zinc content of the finished product. The presence of a considerable excess of zinc oxide during the reaction is usually desirable.

The turpentine -$P_2S_5$ condensation product from which the members of my new class of inhibitors are prepared is, in the absence of excess turpentine, normally a brittle, resinous solid. It is with advantage prepared from turpentine, either steam-distilled wood turpentine or gum spirits, consisting mainly of alpha pinene, a bicyclic terpene having the empirical formula $C_{10}H_{16}$. Pure alpha pinene and other more costly terpenes will react similarly with $P_2S_5$ but, for reasons including economic considerations, I prefer to use the more readily available turpentine. The turpentine used in the specific examples herein was a technical grade steam-distilled wood turpentine comprising about 90% alpha pinene.

As the lubricating oil constituents, various petroleum lubricating oil fractions may be used. For instance, solvent treated or acid treated Mid-Continent or South Texas neutrals or a blend of such neutrals with bright stock or a solvent refined lubricating oil fraction from a Pennsylvania crude or various blends of such lubricating oil fractions may be employed. Characteristics of several such oils which have been used with advantage and which were used in the compounding of my lubricating oil compositions hereinafter set forth, as illustrative of my invention, appear in the following Table I in which base oil A is a solvent-treated Mid-Continent, S. A. E. 10 oil and base oil B is a sulfonated Mid-Continent S. A. E. 30 oil prepared by treating a raw Mid-Continent stock with 40 pounds of 99.3% sulfuric acid per barrel, separating the sludge formed, neutralizing the acid oil with lime, heating the mixture to drive off all water present and filtering the dehydrated oil.

Base oil C is an S. A. E. 30 solvent treated neutral. Base oil D is a solvent treated aircraft oil. Base Oil E is a Mid-Continent base oil conventionally refined by acid treatment. Base oil F is also an acid treated Mid-Continent base oil. Base oil G is an acid treated aircraft lubricating oil fraction.

identified, was 25.6 milliliters and the bearing metal corrosion loss was 5.8 milligrams. By incorporating in this base oil 0.1% of my inhibitor prepared as described in Example II, the mean oxygen absorption rate was reduced to 12.7 milliliters and the bearing metal corrosion loss was reduced to 4.3 milligrams. By compounding with this same base oil 0.25% of said inhibitor, the mean oxygen absorption rate was reduced to 4.6 milliliters and the bearing metal corrosion loss reduced to 2.6.

Further illustrations of my improved lubricating oil compositions and the characteristics thereof with respect to oxygen absorption rates and bearing metal corrosion losses are set forth in the following Table II. In each instance the inhibitor was compounded with the previously identified base oil B, the characteristics of the base oil B without the inhibitor being included for comparison.

Table I

|  | Base oil | | | | | | |
|---|---|---|---|---|---|---|---|
|  | A | B | C | D | E | F | G |
| Gravity, °A. P. I. | 29.5 | 25.5 | 27.6 | 25.3 | 25.0 | 24.7 | 24.6 |
| Flash, °F | 405 | 435 | 450 | 540 | 395 | 450 | 510 |
| Fire, °F | 480 | 500 | 515 | 610 | 455 | 510 | 595 |
| Vis. at 100° F. SUS | 249.6 | 512.1 | 432.3 | 1984.6 | 206.5 | 402.9 | 2,011.6 |
| Vis. at 210° F. SUS | 49.0 | 60.2 | 56.9 | 124.1 | 44.5 | 53.7 | 120.5 |
| Viscosity index | 92.8 | 77.0 | 80.3 | 88.7 | 51.4 | 64.0 | 81.3 |
| Pour, °F | 5 | 5 | 5 | 10 | 15 | 10 | −5 |
| Carbon residue |  |  | 0.03 | 0.58 | 0.02 | 0.05 | 1.15 |
| Sulfur, percent | 0.20 | 0.35 | 0.127 | 0.29 | 0.39 | 0.49 | 0.25 |
| Calcium, percent |  | 0.061 |  |  |  |  |  |
| Neutralization No |  |  | 0.00 | 0.04 | 0.00 | 0.03 | 0.00 |

For the purpose of further illustrating my invention and the advantage derived therefrom, I have herein set forth the results of oxygen absorption and bearing corrosion tests of various of my improved lubricating oil compositions. The advantages of my present invention with respect to oxidation and corrosion characteristics of my improved lubricating oil compositions are illustrated by their mean oxygen absorption rates, as compared with the oxygen absorption rates of the base oil, and the corrosion losses of bearing metal in contact with the respective lubricants.

These tests were carried out in a closed system in which pure oxygen was circulated through 156 grams of the lubricant being tested. The pressure of the system was maintained constant by introducing oxygen from a burette, and the sample was maintained at 360° F. and in contact with two pieces of copper-lead bearings having an approximate combined area of one square inch of copper-lead alloy surface and one square inch of steel surface. The rate of oxygen absorption is calculated as milliliters of oxygen absorbed per minute per 100 grams of oil, measuring the oxygen under standard conditions of temperature and pressure. The bearing corrosion loss is reported as milligrams, the plus sign indicating gain in weight.

The proportions of inhibitor indicated as used in each of the tests herein are based on the weight of the undiluted inhibitor, as distinguished from the 50% concentrate previously described.

When subjected to the foregoing test, the mean oxygen absorption rate of base oil A, previously Table II

| Inhibitor | | Mean rate of O₂ absorption ml. per min. per 100 gms. | Bearing metal corrosion loss, mgs. |
|---|---|---|---|
| Identity | Proportion, per cent | | |
| None |  | 21.6 | 9.8 |
| Example I | 0.1 | 4.23 | 0.2 |
| Example II | 0.1 | 5.28 | 1.1 |
| Example VI | 0.1 | 5.0 | 0.2 |
| Example VII | 0.1 | 3.66 | +0.1 |
| Example VIII | 0.1 | 4.15 | +0.1 |
| Example X | 0.1 | 5.55 | 1.3 |
| Example XI | 0.1 | 6.58 | 2.8 |

From the results of these tests, it appears that though the base oils had high corrosion rates and high oxygen absorption rates, the lubricating oil compositions prepared therefrom, in accordance with my invention, showed in each instance substantially reduced oxygen absorption rates and bearing metal corrosion losses.

The effectiveness of my improved lubricating oil compositions in inhibiting oil deterioration and bearing metal corrosion further appears from results of tests made in accordance with the procedure recommended by the American Society of Testing Materials, published October 1942, and entitled "Proposed method of test for oxidation characteristics of heavy duty crankcase oils" and conventionally known as the "Chevrolet engine test." The improved characteristics of my lubricating oil compositions are further shown by the results of tests carried on in accordance with the method conventionally known as "Heavy duty oil oxidation test," a modification of the test usually designated "Best," herein designated HDOOT, for brevity.

Various lubricating oil compositions, such as contemplated by my present invention and the characteristics thereof, as indicated by the tests just identified, will further illustrate my invention.

Composition A

This lubricating oil composition was composed of the following:

| | Per cent |
|---|---|
| Base oil C | 83.9 |
| Sodium sulfonate detergent | 14.8 |
| Inhibitor of Example II | 1.3 |

The composition contained 0.09% sodium and the equivalent of 0.15% of $P_2S_5$. When tested by the previously identified HDOOT, there resulted a roof deposit of only 3.2 grams, and a CuPb bearing metal loss of 30 milligrams. At the end of the 135 hours test, the oil was found to contain 0.34% of 86° naphtha insoluble material. Its increase in viscosity at 210° F. was 2.0 seconds and its neutralization number was 0.6.

Composition B

This lubricating oil composition was composed of the following:

| | Per cent |
|---|---|
| Base oil C | 83.34 |
| Sodium sulfonate detergent | 14.71 |
| Inhibitor of Example II | 1.95 |

It contained 0.09% sodium and the equivalent of 0.22% of $P_2S_5$. When tested by the above described HDOOT, the roof deposit was found to be 0.14 gram and the CuPb bearing metal loss 27 milligrams. The naphtha insoluble in the used oil was 0.44%, the viscosity rise at 210° F. was 2.9 and the neutralization number was 0.3.

Base oil C alone when subjected to said tests resulted in a roof deposit of 37.5 grams and a CuPb bearing metal loss of 204 milligrams. The oil after the test of 135 hours was found to contain 1.2% of naphtha insoluble material, to have increased in viscosity at 210° F. by 4.2 seconds and to have a neutralization number of 1.5.

A blend of this same base oil, containing 15% of sodium sulfonate and 85% base oil, when subjected to the foregoing test resulted in a roof deposit of 29.1 grams and a CuPb bearing metal loss of 665 milligrams. After the test, the oil was found to contain 1.5% of naphtha insoluble material, to have increased in viscosity at 210° F. by 4.3 seconds and to have a neutralization number of 2.2.

Composition C

This lubricating oil composition was composed of the following:

| | Per cent |
|---|---|
| Base oil C | 79.3 |
| Base oil D | 5.0 |
| Calcium sulfonate detergent | 14.0 |
| Inhibitor of Example II | 1.5 |
| Pour depressant | 0.2 |

The composition contained 0.07% calcium and the equivalent of 0.19% $P_2S_5$. The depressant contained in the oil was a commercial product marketed under the trade-name "Santopour."

When tested by the previously described HDOOT, the roof deposit was 2.4 grams and the CuPb bearing metal loss 28 milligrams. Following the test, the oil was found to contain 0.26% naphtha insoluble, to have increased in viscosity at 210° F. by 4.3 seconds and to have a neutralization number of 1.7.

Composition D

This lubricating oil composition was composed of the following:

| | Per cent |
|---|---|
| Base oil C | 77.7 |
| Base oil D | 6.0 |
| Calcium sulfonate detergent | 14.0 |
| Inhibitor of Example II | 2.2 |
| Pour depressant | 0.1 |

When tested by the previously identified HDOOT, the roof deposit was 1.2 grams and the CuPb bearing metal corrosion loss 8 milligrams. After the test the used oil was found to contain 0.23% naphtha insoluble, to have increased in viscosity at 210° F. by 2.7 seconds and to have a neutralization number of 1.6.

Composition E

This lubricating oil composition was composed of the following:

| | Per cent |
|---|---|
| Base oil F | 62.3 |
| Base oil G | 15.0 |
| Calcium sulfonate detergent | 20.0 |
| Inhibitor of Example II | 2.5 |
| Pour depressant | 0.2 |

The composition contained 0.10% calcium and the equivalent of 0.31% $P_2S_5$. The depressant used was that previously identified.

When tested by the previously described HDOOT, the roof deposit was 1.9 grams and the CuPb bearing metal loss was 1 milligram. Following the test, the oil was found to contain 0.42% naphtha insolubles, to have increased in viscosity at 210° F. by 3.2 seconds and to have a neutralization number of 1.7.

When subjected to the previously identified "Chevrolet engine test," the combined sludge and varnish rating was 81 and the CuBb bearing corrosion loss for the complete bearing was 0.095 gram. At the end of the 36 hour test, the used oil was found to have a neutralization number of 1.65 and to have increased in viscosity at 100° F. by 149 seconds.

In compositions of this type, proportions of the addend as high as 4% have been used with advantage.

Composition F

This lubricating oil composition was composed of the following:

| | Per cent |
|---|---|
| Base oil C | 96.05 |
| Detergent ("Aerolube B") | 2.0 |
| Inhibitor of Example II | 1.95 |

The composition contained 0.20% barium and the equivalent of 0.22% $P_2S_5$.

When tested by the previously described HDOOT, the roof deposit was 1.8 grams, the sump was clean and the CuPb bearing metal loss was 3 milligrams. Following the test, the used oil was found to contain 0.3% naphtha insoluble, to have increased in viscosity at 210° F. by 1.5 seconds and to have a neutralization number of 0.10.

Composition G

This lubricating oil composition was composed of the following:

| | Per cent |
|---|---|
| Base oil C | 84.86 |
| Calcium sulfonate detergent | 13.81 |
| Inhibitor of Example IV | 1.33 |

When tested by the previously identified HDOOT, the roof deposit was 5.3 grams, the condition of the sump was clean and the CuPb bearing loss was 15 milligrams. Following the test the used oil was found to contain 0.31% of naphtha insoluble, to have increased in viscosity at 210° F. by 3.6 seconds and to have a neutralization number of 1.7.

Composition H

This lubricating oil composition was composed of the following:

| | Per cent |
|---|---|
| Base oil C | 84.92 |
| Calcium sulfonate detergent | 13.82 |
| Inhibitor of Example V | 1.26 |

When tested by the previously described HDOOT, the roof deposit was 3.2 grams, the condition of the sump was clean, and the CuPb bearing loss was 8 milligrams. The used oil contained 0.37% of naphtha insoluble, had increased in viscosity at 210° F. by 2.6 seconds and had a neutralization number of 1.3.

Composition I

The lubricating oil composition was composed of the following:

| | Per cent |
|---|---|
| Base oil E | 37.4 |
| Base oil G | 25.0 |
| Calcium sulfonate detergent | 34.9 |
| Inhibitor of Example VII | 2.5 |
| Pour depressant | 0.2 |

When tested by the previously identified HDOOT, the roof deposit was 1.0 gram, the sump was clean and the bearing metal loss was 4 milligrams. The used oil contained 0.55% naphtha insoluble, showed a decrease in viscosity at 210° F. of 2.7 seconds and had a neutralization number of 1.4.

When subjected to the "Chevrolet engine test," the sludge and varnish ratings were each 49, the bearing corrosion loss for the entire bearing was 0.132 gram, the viscosity rise at 100° F. was 62.2 and the neutralization number of the used oil was 2.2.

Composition J

This lubricating oil composition was composed of the following:

| | Per cent |
|---|---|
| Base oil C | 82.86 |
| Sodium sulfonate detergent | 14.62 |
| Inhibitor of Example XI | 2.52 |

When tested by the HDOOT, the roof deposit was 2.5 grams, the sump was clean, the bearing corrosion loss was 5 milligrams, the naphtha insoluble material in the used oil was 0.40%, the viscosity rise at 210° F. was 1.3 and the neutralization number of the used oil was 0.5.

Composition K

This lubricating oil composition was composed of the following:

| | Per cent |
|---|---|
| Base oil C | 83.14 |
| Sodium sulfonate detergent | 14.67 |
| Inhibitor of Example XII | 2.19 |

When tested by the HDOOT, the roof deposit was 1.8 grams, the sump was clean and the bearing corrosion loss was 4 milligrams. The used oil contained 0.47% of naphtha insoluble, showed a rise in viscosity at 210° F. of 1.0 and had a neutralization number of 0.4.

In each of these and numerous other tests, it has been found that lubricating oil compositions prepared in accordance with my present invention are superior with respect to the oxidation and corrosion characteristics of the composition. These results are obtained whether the compositions consist solely of the lubricating oil constituent and my inhibitor or also contain a detergent such as previously noted, for instance calcium petroleum sulfonates. However, the latter compositions are particularly advantageous, as previously noted herein.

I claim:

1. A lubricating oil composition comprising a major proportion of a petroleum lubricating oil and a minor proportion, effective to retard oxidation of the oil, of the reaction product of zinc oxide and an organic compound resulting from the reaction of an alkylated phenol with the condensation product of turpentine and phosphorus pentasulfide, the alkyl group of the alkylated phenol being a saturated aliphatic radical.

2. A lubricating oil composition comprising a major proportion of a petroleum lubricating oil and a minor proportion, effective to retard oxidation of the oil, of the reaction product of zinc oxide and an organic compound resulting from the reaction of an alkylated phenol with the condensation product of turpentine and phosphorus pentasulfide, the alkyl group of the alkylated phenol being a saturated aliphatic radical containing at least 5 carbon atoms.

3. A lubricating oil composition comprising a major proportion of a petroleum lubricating oil and a minor proportion, effective to retard oxidation of the oil, of the reaction product of zinc oxide and an organic compound resulting from the reaction of a polyalkylated phenol with the condensation product of turpentine and phosphorus pentasulfide, the alkyl groups of the alkylated phenol being saturated aliphatic radicals.

4. A lubricating oil composition comprising a major proportion of a petroleum lubricating oil and a minor proportion, effective to retard oxidation of the oil, of the reaction product of zinc oxide and an organic compound resulting from the reaction of diamyl phenol with the condensation product of turpentine and phosphorus pentasulfide.

5. A lubricating oil composition comprising a major proportion of a petroleum lubricating oil and about 0.1 to about 5%, based on the weight of the oil constituent, of the reaction product of zinc oxide and an organic compound resulting from the reaction of an alkylated phenol with the condensation product of turpentine and phosphorus pentasulfide, the alkyl group of the alkylated phenol being a saturated aliphatic radical.

ROBERT L. MAY.